May 4, 1965    W. E. PUTNAM ETAL    3,182,197
RADIOGRAPHY OF WELDED SEAMS
Filed Aug. 6, 1962    2 Sheets-Sheet 2
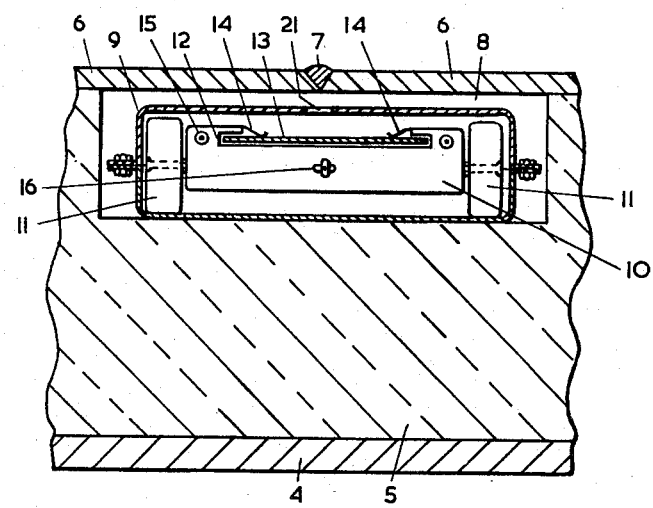
FIG. 2
FIG. 3
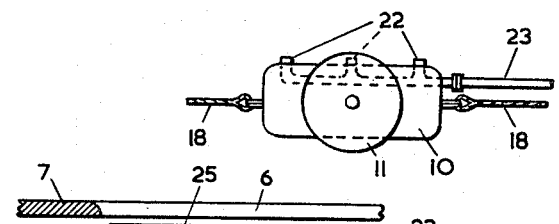
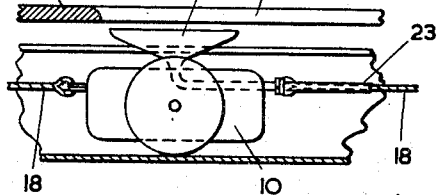
FIG. 4
FIG. 5
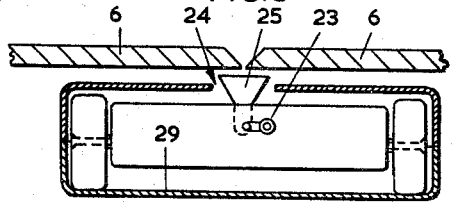
INVENTORS
W. E. Putnam
R. Sutherland
J. K. S. Wardale
By Holcombe Wetherill Brisebois
ATTORNEYS

United States Patent Office 3,182,197
Patented May 4, 1965

3,182,197
RADIOGRAPHY OF WELDED SEAMS
William Elyott Putnam and Ronald Sutherland, Darlington, and John Kedgwyn Stephenson Wardale, Barnard Castle, England, assignors to Whessoe Limited, Darlington, England, a British company
Filed Aug. 6, 1962, Ser. No. 214,975
Claims priority, application Great Britain, Oct. 20, 1961, 37,758/61
11 Claims. (Cl. 250—68)

The design of some welded structures is such that one face of a welded seam included in the structure is inaccessible after the seam has been formed, so that it is difficult or impossible to effect radiographic examination of this seam by the usual techniques.

According to the present invention this difficulty is met by providing closely adjacent one face of the welded seam (namely that face which would otherwise be difficult of access) a duct which extends along the length of the seam and serves as a passageway for a carrier on which the cassette or other container for the radio-sensitive film is mounted, means being provided for moving the carrier to any selected position along the length of the duct; the source of radiation is, of course, disposed adjacent the opposite face of the seam in the normal way.

Particular embodiments of the invention are further described below with reference to the accompanying drawing, in which:

FIGURE 2 is a cross section through the parts shown in FIGURE 1;

FIGURE 3 is a side view of an auxiliary device;

FIGURE 4 is a longitudinal section showng a modified auxiliary device in position in the duct; and FIGURE 5 is a cross section through the parts shown in FIGURE 4.

Figure 1:
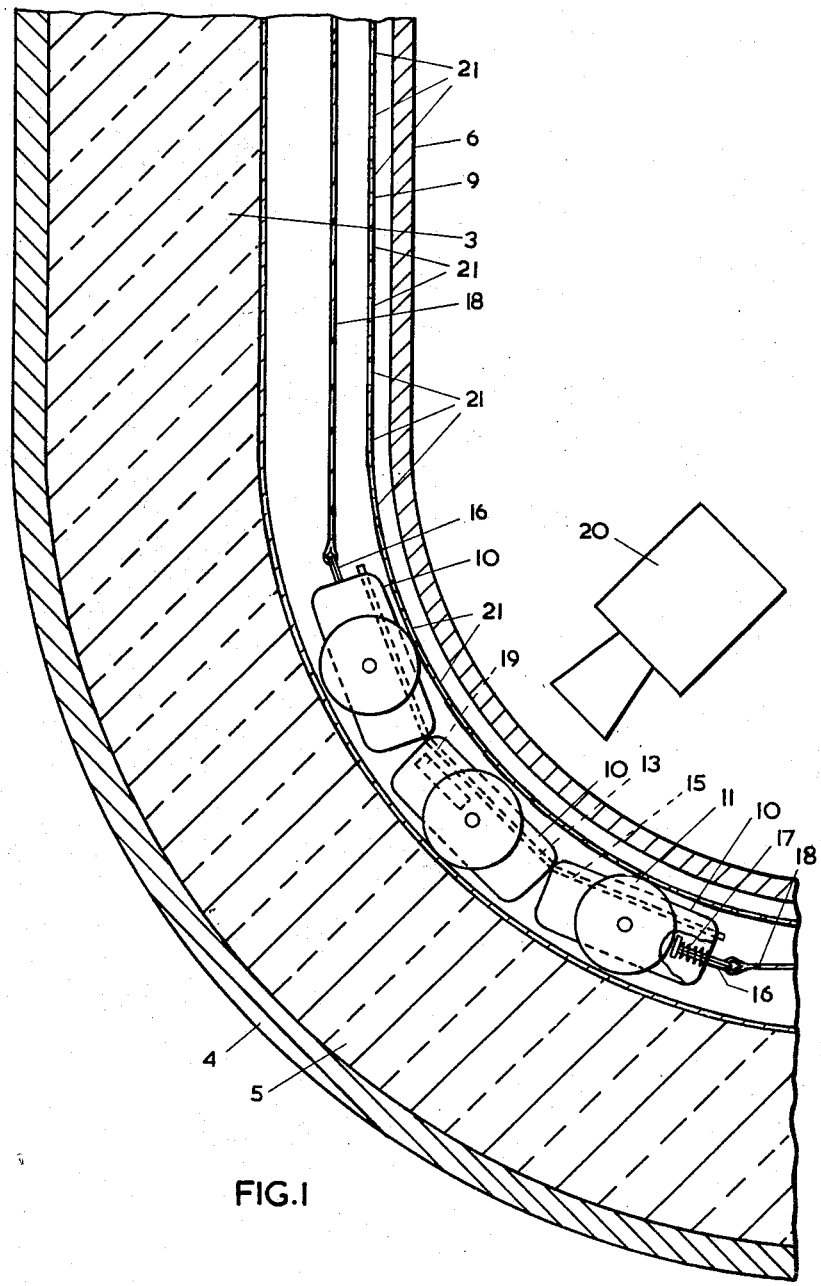
FIGURE 1 shows a vertical radial section through part of a double skinned tank provided with means in accordance with the present invention.

FIGURES 1 and 2 of the drawing show a double skinned tank such as issued, for example, for the storage or transport of certain liquefied gases. The tank is constructed in known manner by first fabricating from mild steel plates the outer skin 4 of the tank, which is then covered internally with suitable insulating material 5. Pre-fabricated sections 6 of an inner tank of aluminium are then lowered into position against the inner surface of the insulating material and the sections are welded together along seams 7 which extend in vertical, radially disposed planes. Radiographic examination of these closing seams cannot easily be effected, since although there is ample room within the tank for the radiographic apparatus itself, there is no easy access to the outer surface of the wall of the inner tank for positioning against it the usual cassette containing radio-sensitive film.

As shown, the invention may be applied to the particular case illustrated by providing, between the inner and outer tank walls and following the line of each of the proposed closing seams in the inner tank, a duct 9 which extends diametrically across the inner surface of the outer tank. The duct may be constructed from sheet metal, resin-bonded fibre glass, or other suitable material. This duct is placed in position in a slot 8, left or cut in the insulating material 5, before the inner tank sections are lowered into position. The duct serves to afford passage for a trolley carrying a radio-sensitive film cassette, the trolley being of articulated construction, so that it can negotiate the radiused corners between the bottom and the side walls of the tank.

In the construction illustrated, the trolley consists of three sections, each having a chassis 10 supported between a pair of wheels 11, mounted for rotation about a common horizontal transverse axis. The top or inner faces of the chassis sections are formed with aligned slots 12 which accommodate a standard flexible film cassette 13, extending continuously across the three trolley sections and held in position by suitable clips 14. The chassis sections of the trolley are held together by a pair of slightly tensioned flexible steel wires 15, which pass through longitudinal bores in the sections, one wire being disposed on each side of the cassette and in the plane of the latter, so that puckering of the cassette as the articulated trolley passes round a bend in the duct will be eliminated, or reduced to a minimum. The two end sections of the trolley are fitted with draw bars 16, connected to the trolley through springs 17 and attached to cables 18, which pass in opposite directions through the length of the duct to the open ends thereof.

In use, the cables 18 are pulled and paid out to the extent required to position the rolley and the casette which it carried in register with the portion of the seam to be radiographed, the radiographic apparatus 20 providing the source of radiation being appropriately positioned on the inside of the tank. The exact position of the cassette can be ascertained by mounting a permanent magnet 19 on the trolley and using a magnetic dip needle, or other detecting device, held by an operator on the inside of the tank close to the wall to determine the position of the magnet. Alternatively, the exact length of the cable paid out from one or other end of the duct can be noted and the position of the trolley deduced from this information. When a radiograph has been made, the trolley is withdrawn from the duct, the cassette is replaced by a fresh one, and the trolley is then drawn to a fresh position in the duct, and the apparatus 20 is correspondingly repositioned, the operations being repeated as often as necessary. When radiography has been completed, the duct may be filled with suitable insulating material, for example granular insultant or foamable plastic, or it may be left permanently open and available for subsequent use if ever required.

To reduce the time required to effect radiography of a long seam, two or more trolleys, each carrying a radio-sensitive film cassette, may be coupled together to form a train. When the film on one trolley has been exposed, a relatively small movement of the train will be sufficient to position the film on the next trolley for exposure. Only after the succesive exposure of the films on all the trolleys, is it necessary to withdraw the train of trolleys to the end of the duct for reloading with fresh film. During exposure of the film on one trolley of the train, the films on the remaining trolley or trolleys are suitably protected against exposure, for example by lead screens placed against the inner face of the inner tank wall 6 at one or both ends of the section of the seam 7 which is being radiographed.

In addition to being used for the purpose described above, the duct 9 may be employed during the formation of the welded seam to produce or maintain at the site of the weld conditions which are necessary or advantageous to the welding operation. For example, in the case of aluminium welding it is necessary to produce or maintain dry conditions in the weld area and in this case the duct may be used to supply warm air to the back of the weld area, before or during the welding operation. Again, in certain circumstances it may be advantageous to create an inert gas atmosphere behind the weld, for example in the case of aluminium welding an atmosphere of argon may be used, and in such a case, the duct may be utilised to supply the inert gas to the weld area.

To allow of its being so used for the supply of gaseous fluid to the weld area, the duct shown in FIGURES 1 and 2 is formed on the side facing the weld seam with openings 21, distributed along the length of the duct, for the escape of gaseous fluid introduced through one or both ends of the duct. The supply of fluid is conveniently effected through a flexible hose, connected at one end to a source of suitable fluid and extending through one end of the duct to the appropriate point along its length, where the gas is discharged from the hose and escapes through the openings 21 to the back of the weld area. The hose may be simply attached to a cable and pulled through the duct to the appropriate point. More conveniently, as shown in FIGURE 3, the discharge end of the flexible hose 23 is attached to a trolley similar to one of the sections of the trolley used for the radio-sensitive film cassette, the hose being connected to a discharge pipe 22, which is mounted on the chassis 10 of the trolley and has outlets directed towards the openings 21 in the duct.

In an alternative arrangement, shown in FIGURES 4 and 5, the duct 29 is formed with a continuous longitudinal slot 24, replacing the separate openings 21. The gas supply hose 23 is connected to a discharge pipe mounted on a trolley 10, as in FIGURE 3, but in this case the discharge pipe 25 has an elongated outlet nozzle of fishtail or other design, which projects through the slot 24 in the duct and discharges the gas in close proximity to the back of the weld area.

It will be understood that the invention is not limited to the examination of tanks of the particular construction described above, but may be applied with any appropriate modifications to the examination of other welds which are similarly difficult of access. Equally, the invention is not limited to the particular means described for supporting and locating the X-ray film and for supplying gaseous fluid to the weld area, the means described being capable of many modifications. For example, the duct illustrated may be replaced by a pair of channel sections, spaced apart and arranged with their flanges directed inwardly, each channel serving as a guide rail for the wheels on one side of the articulated trolley. Instead of connecting each end of the trolley to a separate cable, the trolley may be clamped to a continuous cable passing through a channel in the chassis of the trolley. Where the welded seam runs in a horizontal plane, instead of in a vertical plane, as in the case of a circumferential weld in the wall of a tank, the wheel system of the trolley is re-arranged so as to afford appropriate support for the trolley during its movement through the horizontal duct.

We claim:

1. Means for effecting radiographic examination of a welded seam in one wall of a double walled tank, comprising an open ended duct located in the interspace between the inner and outer walls of said tank, adjacent one surface of said one wall, said duct extending along the line of said seam, a carrier insertable through one end of said duct and movable longitudinally through it, a container of radio-sensitive film removably supported by said carrier, means for moving said carrier to any selected position along the length of said duct, and a source of radiation disposed adjacent the other surface of said one wall and movable to a position opposite said seam and said film.

2. Means in accordance with claim 1 in which the said interspace contains insulating material, the duct being positioned in a slot left or cut in the insulating material.

3. Means in accordance with claim 1 in which the carrier takes the form of an articulated trolley, comprising a plurality of chassis sections mounted upon wheels and hingedly connected together end to end.

4. Means in accordance with claim 3 in which the trolley sections are hingedly connected together by flexible tension members which extend through longitudinal bores in the sections and hold the sections in abutting end to end relation.

5. Means in accordance with claim 3 in which the hinged connections between the trolley sections lie in the plane in which the radio-sensitive film is supported on the trolley.

6. Means in accordance with claim 1 in which the carrier is provided at its two ends with spring loaded draw bars, to which are attached cables extending through the length of the duct to the opposite open ends thereof.

7. Means in accordance with claim 1 in which a permanent magnet is mounted on the carrier.

8. Means in accordance with claim 1 in which a plurality of carriers, each supporting a radio-sensitive film, are coupled together to form a train, whose position can be adjusted along the duct to allow successive exposure of the several films.

9. Means in accordance with claim 1 in which the duct is open, at least at intervals along its length, on the side facing the weld seam, means being provided for feeding gaseous fluid through the duct.

10. Means in accordance with claim 9, in which the means for feeding gaseous fluid through the duct comprise a flexible hose connected at one end to a source of fluid and extending through one end of the duct to a point along the length thereof, the delivery end of the hose being attached to a carrier, said carrier being adapted to be moved to any selected position along the length of the duct.

11. Means in accordance with claim 10, in which the carrier supports a discharge pipe to which the hose is coupled, the discharge pipe projecting through a continuous slot in the duct into close proximity with the weld area.

References Cited by the Examiner
UNITED STATES PATENTS

| 2,437,688 | 3/48 | Forssell | 250—65 |
| 2,532,536 | 12/50 | Boucher | 250—65 |
| 2,719,926 | 10/55 | Procter et al. | 250—65 |
| 3,087,058 | 4/63 | Arvanetakis et al. | 250—65 |

RALPH. G. NILSON, *Primary Examiner.*